United States Patent
Kaplinger et al.

(10) Patent No.: US 10,216,856 B2
(45) Date of Patent: *Feb. 26, 2019

(54) MOBILIZING AN EXISTING WEB APPLICATION

(71) Applicant: International Business Machines Corporation, Armonk, NY (US)

(72) Inventors: Todd E. Kaplinger, Raleigh, NC (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 14/604,806

(22) Filed: Jan. 26, 2015

(65) Prior Publication Data

US 2015/0378579 A1 Dec. 31, 2015

Related U.S. Application Data

(63) Continuation of application No. 14/315,376, filed on Jun. 26, 2014.

(51) Int. Cl.
*G06F 11/34* (2006.01)
*G06F 17/30* (2006.01)
*H04L 29/08* (2006.01)

(52) U.S. Cl.
CPC .... *G06F 17/3089* (2013.01); *G06F 17/30899* (2013.01); *H04L 67/02* (2013.01);
(Continued)

(58) Field of Classification Search
CPC .......... G06F 17/3089; G06F 17/30899; G06F 11/34; G06F 11/3438; G06F 11/3442; H04L 67/303; H04L 67/22; H04L 67/02
See application file for complete search history.

(56) References Cited

U.S. PATENT DOCUMENTS

| 7,185,286 B2* | 2/2007 | Zondervan ........ G06F 17/30899 707/E17.119 |
| 7,246,306 B2* | 7/2007 | Chen ..................... G06F 17/211 715/205 |

(Continued)

FOREIGN PATENT DOCUMENTS

CN       103049271 A       4/2013

OTHER PUBLICATIONS

Serwatka, Lukasz, "Building mobile browser and hybrid applications with eZ Publish", Jul. 7, 2011, eZ Community Knowledge Base, pp. 1-41, Retrieved from http://share.ez.no/learn/ez-publish/building-mobile-browser-and-hybrid-applications-with-ez-publish/(language)/eng-GB on Oct. 16, 2015.

(Continued)

*Primary Examiner* — Emerson C Puente
*Assistant Examiner* — Erika Kretzmer
(74) *Attorney, Agent, or Firm* — Edward J. Wixted, III (57) ABSTRACT

In an approach for adjusting a web application to comply with user interface capabilities of a device type, a processor monitors usage patterns of a web application by a user, including monitoring device type. The processor monitors input and output network communication data of a resource of a web application. The processor converts the monitored network data to Extensible Markup Language Schema (XSD), and updates documentation of the resource of the web application with the converted data. The processor further receives user interface capabilities of a device type and analyzes a web application for compatibility with the user interface capabilities of the device type. Based on the compatibility analysis, at least one user interface element is be modified within presentation of the web application on the device type. A processor generates a version of the web (Continued)

application compatible with the user interface capabilities of the device type.

11 Claims, 5 Drawing Sheets

(52) U.S. Cl.
CPC ............ *H04L 67/22* (2013.01); *H04L 67/303* (2013.01); *G06F 11/3442* (2013.01)

(56) References Cited

U.S. PATENT DOCUMENTS

| | | | |
|---|---|---|---|
| 7,480,858 B2 | 1/2009 | Chen et al. | |
| 7,698,398 B1* | 4/2010 | Lai | G06F 8/10 709/223 |
| 7,925,691 B2* | 4/2011 | Westphal | G06F 17/3089 709/203 |
| 7,930,646 B2* | 4/2011 | De Souza Sana | G06F 3/0481 715/784 |
| 8,302,016 B2 | 10/2012 | Goto | |
| 8,375,351 B2* | 2/2013 | Ahadian | G06F 8/24 717/101 |
| 8,448,074 B2 | 5/2013 | Forutanpour et al. | |
| 8,504,681 B1 | 8/2013 | Cooper | |
| 8,595,186 B1* | 11/2013 | Mandyam | G06F 8/38 707/632 |
| 8,739,126 B2 | 5/2014 | Glaser et al. | |
| 8,843,844 B2 | 9/2014 | Laubach | |
| 8,856,735 B2 | 10/2014 | Nimashakavi et al. | |
| 9,047,259 B1 | 6/2015 | Ho et al. | |
| 9,189,244 B2 | 11/2015 | McMahon et al. | |
| 9,230,030 B2* | 1/2016 | Xue | G06F 17/30867 |
| 9,959,363 B2* | 5/2018 | Kaplinger | G06F 17/3092 |
| 2003/0051059 A1* | 3/2003 | Zondervan | G06F 17/30899 709/250 |
| 2003/0200533 A1 | 10/2003 | Roberts et al. | |
| 2004/0205513 A1* | 10/2004 | Chen | G06F 17/211 715/205 |
| 2007/0016848 A1 | 1/2007 | Rosenoff et al. | |
| 2008/0046507 A1* | 2/2008 | Westphal | G06F 17/3089 709/203 |
| 2008/0201338 A1 | 8/2008 | Castro et al. | |
| 2008/0228910 A1* | 9/2008 | Petri | G06F 17/30905 709/224 |
| 2008/0250394 A1* | 10/2008 | Jones | G06F 8/73 717/123 |
| 2008/0320441 A1* | 12/2008 | Ahadian | G06F 8/24 717/108 |
| 2009/0106687 A1* | 4/2009 | De Souza Sana | G06F 3/0481 715/784 |
| 2009/0164621 A1 | 6/2009 | Kothari et al. | |
| 2009/0303676 A1 | 12/2009 | Behar et al. | |
| 2010/0077321 A1 | 3/2010 | Shen et al. | |
| 2010/0161785 A1* | 6/2010 | Xue | G06F 17/30867 709/224 |
| 2010/0199197 A1 | 8/2010 | Faletski et al. | |
| 2010/0251128 A1 | 9/2010 | Cordasco | |
| 2011/0099185 A1 | 4/2011 | Trevor et al. | |
| 2011/0161465 A1 | 6/2011 | Kowalski | |
| 2012/0060087 A1 | 3/2012 | Jame et al. | |
| 2012/0066601 A1 | 3/2012 | Zazula et al. | |
| 2012/0240019 A1 | 9/2012 | Nuzzi | |
| 2012/0310899 A1* | 12/2012 | Wasserman | G06F 17/3056 707/687 |
| 2013/0055097 A1 | 2/2013 | Soroca et al. | |
| 2013/0073945 A1* | 3/2013 | Bingell | G06F 17/30905 715/234 |
| 2013/0080910 A1* | 3/2013 | Bingell | G06F 3/048 715/744 |
| 2013/0205279 A1 | 8/2013 | Osminer et al. | |
| 2014/0026113 A1 | 1/2014 | Farooqi | |
| 2014/0372970 A1 | 12/2014 | Broussard et al. | |
| 2015/0007128 A1 | 1/2015 | Yu et al. | |
| 2015/0046856 A1 | 2/2015 | Rucker et al. | |
| 2015/0378575 A1 | 12/2015 | Kaplinger et al. | |
| 2015/0378579 A1 | 12/2015 | Kaplinger et al. | |
| 2015/0378684 A1 | 12/2015 | Kaplinger et al. | |
| 2015/0378685 A1 | 12/2015 | Kaplinger et al. | |
| 2015/0378994 A1 | 12/2015 | Kaplinger et al. | |
| 2018/0115899 A1 | 4/2018 | Kedem et al. | |

OTHER PUBLICATIONS

U.S. Appl. No. 14/315,363 entitled "User Interface Element Adjustment Using Web Analytics" filed Jun. 26, 2014.
U.S. Appl. No. 14/315,376 entitled "Self-Documentation for Representational State Transfer (REST) Application Programming Interface (API)" filed Jun. 26, 2014.
U.S. Appl. No. 14/315,372 entitled "Mobilize Website Using Representational State Transfer (REST) Resources" filed Jun. 26, 2014.
Anubavam; "Website to mobile app"; retrived on Jan. 23, 2014 from website: <http://www.anubavam.com/website-to-mobile-app>.
Anonymous; "Method and System for Rendering Simplified Content Mobile Devices"; An IP.com Prior Art Database Technical Disclosure; IPCOM000204076D; IP.com Electronic Publication: Feb. 10, 2011.
Anonymous; "Mobilizing an Existing Web Application: Method of Runtime Code Adaptation"; An IP.com Prior Art Technical Disclosure; IPCOM000223897D; IP.com Electronic Publication: Dec. 5, 2012.
Anonymous; "Method and System for Automatically Analyzing a Website for Converting to a Mobile Web Application"; An IP.com Prior Art Database Technical Disclosure; IPCOM000223896D; IP.com Electronic Publication: Dec. 5, 2012.
Anonymous, "Mobilizing an Existing Web Application: Method to Optimize REST Calls in Client for a Mobile Environment"; An IP.com Prior Art Database Technical Disclosure; IPCOM000223898D; IP.com Electronic Publication: Dec. 5, 2012.
Apache CXF; "JAX-RS Services Description"; Retrieved on Jan. 22, 2014 from website: <http://cxf.apache.org/docs/jaxrs-services-description.html>.
Beryozkin; "Musings About Web Services"; Sunday, Oct. 2, 2011; Retrieved from website: <http://sberyozkin.blogspot.com/2011/10/describing-json-services-in-web . . . >.
Buddy Media; "Manage and publish social content using Buddy Media"; Retrieved on Jan. 22, 2014 from website: <http://www.salesforcemarketingcloud.com/sem/buddymedia . . . >.
Careveo; "Using json-schema for exploring API servers"; Jun. 30, 2011, Retrieved from website: <http://shane.caraveo.com/2011/06/30/using-json-schema-for-exploring . . . >.
Chen, et al.; "Coordinated data prefetching for web contents"; Elsevier, Science Direct; copyright 2005 Elsevier B.V.; doi: 10.1016/j.comcom.2005.04.003.
Flynn; "IBM Web Experience Factory: Web Experience Factory"; IBM; Retrieved on Jan. 23, 2014 from website: <http://www-10.lotus.com/Idd/pfwiki.nsf/dx/IBM_Web_Experience_Factory . . . >.
Forge; "The fastest way to build applications, share your software, and enjoy doing it"; JBoss Forge; Retrieved on Jan. 23, 2014 from website: <http://forge.jboss.org/?_sscc=t>.
Gerasika; "How to Convert JSON to XML Using ANTLR"; GerixSoft, Saturday, Jun. 11, 2011; Retrieved from website: <http://www.gerixsoft.com/blog/xslt/json2xm12>.
Gerasika; "How to Convert JSON to XML Using XSLT 2.0"; GerixSoft, Saturday, Jul. 3, 2010; Retrieved from website: <http://www.gerixsoft.com/blog/xslt/json2xm17>.
Golega et al.; "Generating Web Applications from Process Models"; ICWE '06 Workshops; Jul. 10-14, 2006; Palo Alto, CA; Copyright 2006 ACM 1-59593-435-09/06/07.
Google Analytics; "Analytics Collection"; last updated Jul. 9, 2013; Retrieved from website: <https://developers.google.com/analytics/devguides/collection/>.
Giunipero; "Creating a Simple Web Application Using MySQL Database"; Retrieved on Jan. 23, 2014 from website: <https://netbeans.org/kb/docs/web/mysql-webapp.html>.

(56) References Cited

OTHER PUBLICATIONS

Guest Author; "Paint by Numbers: Guided Design Through Web Analytics"; Dec. 9, 2010; Retrieved from website: <http://blog.sigmamarketing.com/2010/12/paint-by-numbers-guided-design . . . >.

IBM; "IBM Security AppScan"; IBM Software; Retrieved on Jan. 23, 2014 from website: <http://www-03.ibm.com/software/products/en/appscan>.

Jersey; "Extended WADL example for JSON"; Retrieved on Jan. 22, 2014 from website: <http://jersey.576304.n2.nabble.com/Extended-WADL-example-for-JSON>.

Kumar et al.; "A Predicted Region based Cache Replacement Policy for Location Dependent Data in Mobile Environment"; I.J. Communications; Network and System Sciences, 2008; 1: 1-103; Copyright 2008 SciRes.

Paolini; "Web Analytics & Search: What's Happening to My Traffic?"; Jun. 8, 2010; MPThree Consulting Inc.; Retrieved from website: <http://mpaolini.com/web-analytics-the-basics>.

PR Newswire Services; "New Wily 6 Solution Delivers Unmatched End-to-End Web Application Management"; Source is Wily Technology, Inc.; Retrieved on Jan. 23, 2014 from website: <http://www.prnewswire.com/news-releases/new-wily-6-solution-delivers . . . >.

Programmable Web; REST API Design: Put the "Type" in "Content-Type"; Nov. 18, 2011; Retrieved from website: <http://blog.programmableweb.com/2011/11/18/rest-api-design-putting . . . >.

Serwatka; "Building native mobile applications with eZ Publish REST API"; eZ Community Knowledge Base; <http://share.ez.no/learn>; the eZ Publish Community Gateway.

Stack Overflow; "Create and link XSD to WADL"; Retrieved on Jan. 22, 2014 from website: <http://stackoverflow.com/questions/6168573/create-and-link-xsd-to-a-wadl>.

Stack Overflow; "Is it possible to convert web application to mobile application?"; Retrieved on Jan. 23, 2014 from website: <http://stackoverflow.com/questions/743348/is-it-possible-to-convert-web-application-to-mobile-application>.

Tiggzi, "Tiggzi—Features"; Product website; Retrieved on Jan. 23, 2014 from website: <https://web.archive.org/web/20130329010933/http://tiggzi.com/features#>.

Veracode; "Vulnerability Scanning Tools"; Copyright 2006-2013 Veracode Inc.; Burlington, MA; Retrieved from website: <http://www.veracode.com/security/vulnerability-scanning>.

Verborgh; "Easy restfull JAX-RS webservices and extended WADL on Glassfish v3 (using ant.)"; Nov. 21, 2009; Retrieved from website: <http://www.verborgh.be/articles/2009/11/21/easy-restfull-jax-rs-webservices>.

Wikipedia; "List of graphical user interface builders and rapid application development tools"; Retrieved on Jan. 23, 2014 from website: <http://en.wikipedia.org/w/index.php?title=List_of_graphical_user_interface_builders_and_rapid_application_development_tools>.

Wikipedia; "Web log analysis software"; Retrieved on Jan. 22, 2014 from website: <http://en.wikipedia.org/wiki/Web_log_analysis_software>.

Zucker; "What is "Integrated Analytics"?"; Bridgeline Software; Whitepaper; Copyright 2009 Bridgeline Software Inc.; Woburn, MA.

Machi; "dojox.analytics"; dojo; dojo.analytics—The Dojo Toolkit—Reference Guide; Printed Jan. 22, 2014; <http://dojotoolkitorg/reference-guide/1.7/dojox/analytics.html#dojox-analytics>.

U.S. Appl. No. 14/315,363, filed Jun. 26, 2014; Entitled "User Interface Element Adjustment Using Web Analytics".

U.S. Appl. No. 14/315,367, filed Jun. 26, 2014; Entitled "Self-Documentation for Representational State Transfer (REST) Application Programming Interface (API)".

U.S. Appl. No. 14/315,372, filed Jun. 26, 2014; Entitled "Mobilizing Website Using Reprsentational State Transfer (REST) Resources".

U.S. Appl. No. 14/315,376, filed Jun. 26, 2014; Entitled "Mobilizing an Existing Web Application".

List of IBM Patents or Patent Applications Treated As Related.

Appendix P: List of IBM Patents or Patent Applications Treated As Related, dated Jan. 26, 2015, 2 pages.

Serwatka, "Building native mobile applications with the eZ Publish REST API", eZ Community Knowledge Base : <http://share.ez.no/learn>, The eZ Publish Community Gateway, Oct. 13, 2011, 38 pages.

U.S. Appl. No. 14/315,367 entitled "Self-Documentation for Representational State Transfer (REST) Application Programming Interface (API)" filed Jun. 26, 2014.

Ravindranath, et al.; "Procrastinator: Pacing Mobile Apps' Usage of the Network"; MobiSys'14; Jun. 16-19, 2014, ACM, pp. 1-13.

\* cited by examiner

MOBILIZING AN EXISTING WEB APPLICATION

FIELD OF THE INVENTION

The present invention relates generally to the field of web development, and more particularly to mobilizing an existing web application.

BACKGROUND OF THE INVENTION

Web analytics is the measurement, collection, analysis and reporting of web data for purposes of understanding and optimizing web usage. Web analytics can be used as a tool to assess and improve the effectiveness of a web site. Web analytics may be off-site, on-site, or a combination of the two. Off-site web analytics refers to web measurement and analysis regardless of whether a person owns a website, and includes the measurement of a website's potential audience, webpage loading time, data accessed, type of device used to access the site by a user, and potentially other information. On-site web analytics can be used by the owner of a website to measure a visitor's behavior on the website. On-site web analytics can include UI widget element accesses, user inaction, user interactions on a webpage, inaction on a webpage (e.g., hovering a mouse), mouse clicks on a webpage, and potentially other information.

The mobile web refers to access to the Internet from a handheld mobile device, such as a smartphone connected to a mobile network or other wireless network. Mobile devices can include smartphones, netbooks, tablets, e-books, and other devices with a variety of screen sizes and input capabilities (e.g., touchscreen, mouse, keyboard, etc.).

Self-documenting is a common descriptor for source code and user interfaces that follow certain loosely defined conventions for naming and structure. These conventions are intended to enable developers, users, and maintainers of a system to use it effectively without requiring previous knowledge of its specification, design, or behavior.

Representational state transfer (REST) is a set of principles that define how web standards, such as Hypertext Transfer Protocol (HTTP) and uniform resource identifier (URI), are supposed to be used. REST is intended to evoke an image of how a well-designed web application behaves: presented with a network of webpages, a user progresses through an application by selecting links, or state transitions, resulting in the next page being transferred to the user and rendered for their use. RESTful applications maximize the use of existing, well-defined interfaces and other built-in capabilities provided by the chosen network protocol, and minimize the addition of new application-specific features.

JavaScript™ Object Notation (JSON) is a lightweight data-interchange format. Java and all Java-based trademarks and logos are trademarks or registered trademarks of Oracle and/or its affiliates. JSON is easy for humans to read and write, and for machines to parse and generate. JSON is an open standard format that uses human-readable text to transmit data objects consisting of attribute-value pairs. JSON is used primarily to transmit data between a server and web application, as an alternative to Extensible Markup Language (XML).

Web Application Description Language (WADL) is a resource-centric description language which has been designed to facilitate the modeling, description, and testing of RESTful web applications. WADL models the resources provided by a service and the relationships between them. WADL is intended to simplify the reuse of web services that are based on the existing HTTP architecture of the Web.

SUMMARY

Aspects of an embodiment of the present invention disclose a method, computer program product, and computer system for adjusting a web application to comply with user interface capabilities of a device type. A processor receives user interface capabilities of a device type. A processor analyzes a web application for compatibility with the user interface capabilities of the device type. A processor determines at least one user interface element to be modified within presentation of the web application on the device type based on the analyzed compatibility of the web application with the user interface capabilities of the device type. A processor generates a version of the web application compatible with the user interface capabilities of the device type.

DETAILED DESCRIPTION

Embodiments of the present invention recognize that mobilizing an existing website can be a costly and time consuming process. Embodiments of the present invention recognize that a solution is required to optimize the process of mobilizing an existing website using a combination of techniques in a logical manner.

The present invention will now be described in detail with reference to the Figures.

Figure 1:
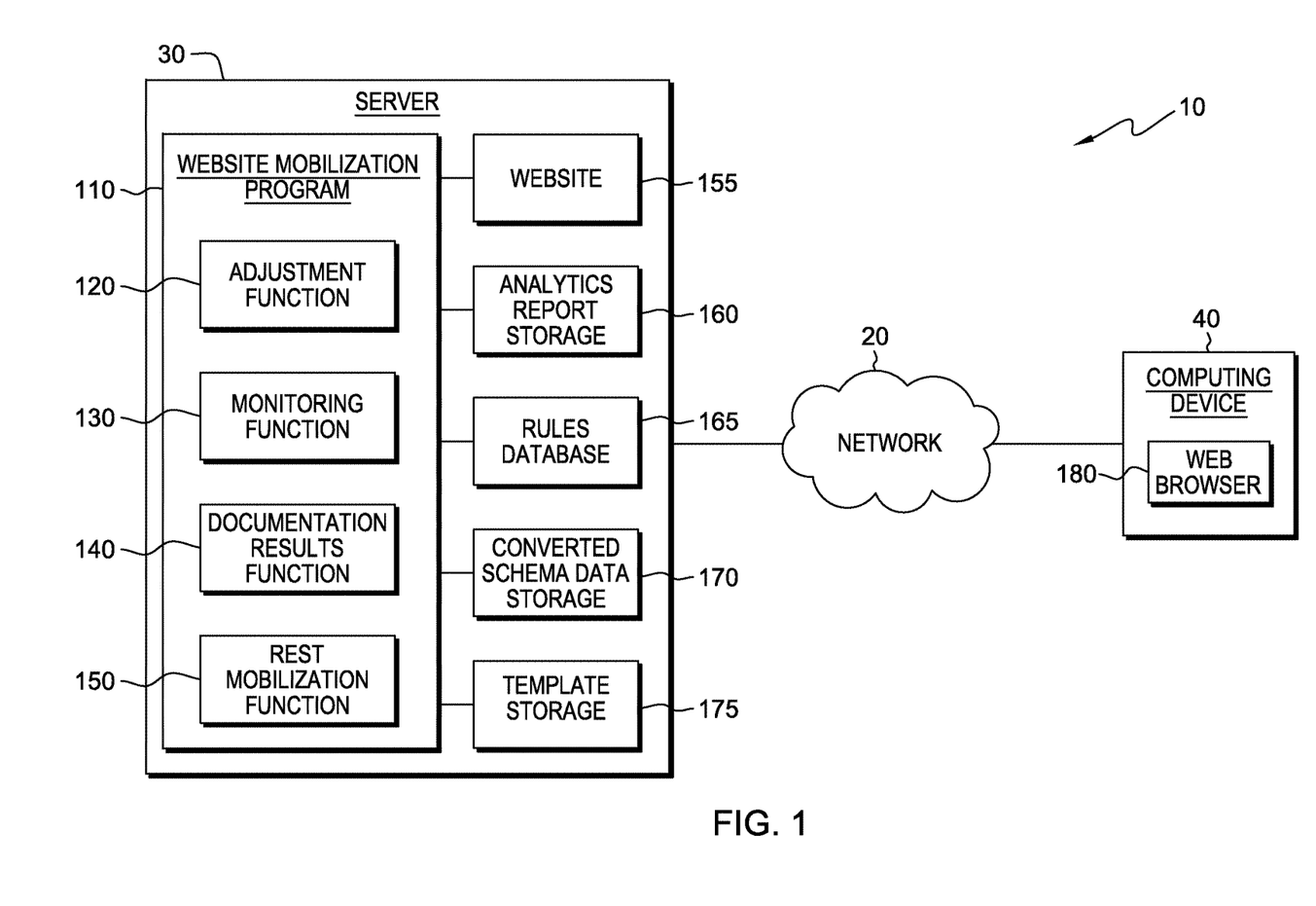
FIG. 1 depicts a diagram of a computing system, in accordance with one embodiment of the present invention.

FIG. 1 depicts a diagram of computing system 10, in accordance with one embodiment of the present invention.

FIG. 1 provides only an illustration of one embodiment and does not imply any limitations with regards to the environments in which different embodiments may be implemented.

In the depicted embodiment, computing system 10 includes server 30 and computing device 40 interconnected over network 20. Network 20 may be a local area network (LAN), a wide area network (WAN) such as the Internet, the public switched telephone network (PSTN), any combination thereof, or any combination of connections and protocols that will support communications between server 30 and computing device 40, in accordance with embodiments of the invention. Computing system 10 may include additional computing devices, servers, computers, or other devices not shown.

Server 30 may be a management server, a web server, or any other electronic device or computing system capable of processing program instructions, receiving and sending data. In some embodiments, server 30 may be a laptop computer, tablet computer, netbook computer, personal computer (PC), a desktop computer, or any programmable electronic device capable of communicating with computing device 40 and/or other computing devices via network 20. In other embodiments, server 30 may represent a server computing system utilizing multiple computers as a server system, such as in a cloud computing environment. Server 30 contains website mobilization program 110, adjustment function 120, monitoring function 130, documentation results function 140, representational state transfer (REST) mobilization function 150, website 155, analytics report storage 160, rules database 165, converted schema data storage 170, and template storage 175. Server 30 may include components, as depicted and described in further detail with respect to FIG. 7.

Website 155 is any web document containing information accessible to other computing devices, such as computing device 40, through a web browser over network 20. Website 155 may include one or more widgets (e.g., JavaScript widgets), page objects, user interface elements, images, or other elements. A widget is a stand-alone, or self-contained, application or set of script or code for use within a webpage, such as website 155. In general, website 155 is any website capable of being monitored by website mobilization program 110 and capable of having alterable user interface elements, such as links, menu items, or other elements.

Analytics report storage 160 may be a repository that may be written and/or read by website mobilization program 110 and adjustment function 120. Analytics reports and web analytics information gathered, recorded, deciphered or otherwise observed by website mobilization program 110 may be stored to analytics report storage 160. For example, analytics information, the time the information was gathered, identifying characteristics of users, and other information may be stored to analytics report storage 160. In one embodiment, analytics report storage 160 resides on server 30. In other embodiments, analytics report storage 160 may reside on another server, another computing device, or computing device 40, provided that analytics report storage 160 is accessible to website mobilization program 110 and adjustment function 120.

Rules database 165 may be a repository that may be written and/or read by adjustment function 120. In some embodiments, a program (not shown) may allow a web developer, administrator, or other user to define rules and write the defined rules to rules database 165. Rules relevant to the layout or population of data on a website, such as website 155, may be stored to rules database 165. For example, rules may specify the number of links to be shown in a list on a particular device, organizational settings based on hit frequency, or settings specifying that links, page objects, or widgets should be removed from a page due to lack of use by users of website 155. In some embodiments, rules database 165 associates a set of one or more rules with a particular device, or type of device (e.g., smartphone, tablet, PC, etc.). For example, one set of rules stored to rules database 165 may indicate layout rules associated with smartphone devices, while a different set of rules stored to rules database 165 specify a different set of one or more rules associated with tablet devices. In one embodiment, rules database 165 resides on server 30. In other embodiments, rules database 165 may reside on another server, another computing device, or computing device 40, provided that rules database 165 is accessible to adjustment function 120.

Converted schema data storage 170 may be a repository that may be written and read by website mobilization program 110, monitoring function 130, and/or documentation results function 140. Monitoring function 130 may convert JavaScript Object Notation (JSON) input/output data to a self-documenting schema format, such as Extensible Markup Language (XML) Schema (XSD), and store the converted data to converted schema data storage 170. In some embodiments, converted data stored to converted schema data storage 170 is stored according to a particular naming convention, or otherwise associated with the web application represented by the applicable REST resource.

Template storage 175 may be a repository that may be written to and read by website mobilization program 110 and REST mobilization function 150. Templates corresponding to patterns in REST interfaces may be stored to template storage 175. In some embodiments, templates stored to template storage 175 may be created by a user at server 30 using a user interface associated with website mobilization program 110. In one embodiment, template storage 175 resides on server 30. In other embodiments, template storage 175 may reside on another server, computing device 40, or another computing device, provided that template storage 175 is accessible to website mobilization program 110 and REST mobilization function 150.

Website mobilization program 110 operates to mobilize an existing website, such as website 155 using a variety of techniques and methods. Website mobilization program 110 also is a web analytics tool that operates to collect and display data about users visiting a website, such as website 155. In some embodiments, website mobilization program 110 generates analytics reports or a set of information gathered from a website, such as website 155, and stores the information to analytics report storage 160. An analytics report may include information related to a particular version of website 155 and include information related to the usage of website 155 over a specified time period. In some embodiments, website mobilization program 110 resides on server 30. In other embodiments, website mobilization program 110 may reside on another server or another computing device, provided that website mobilization program 110 has access to website 155, analytics report storage 160, rules database 165, converted schema data storage 170, and template storage 175.

Adjustment function 120 operates to retrieve analytics information, such as analytics information stored to analytics report storage, and rules, such as rules stored to rules database 165, to adjust and/or populate user interface elements of a webpage, such as website 155. In some embodiments, adjustment function 120 further considers multiple types of devices and adjusts and/or populates user interface elements of websites, such as website 155, based upon the type of device that may access the information. In some embodiments, adjustment function 120 adjusts and/or populates user interface elements of websites, such as website 155, based upon usage patterns observed by website mobilization program 110. For example, usage patterns of website 155 may vary based upon the time website 155 was accessed, the type of device upon which a user accessed website 155, or other identified patterns. In some embodiments, adjustment function 120 retrieves analytics information from analytics report storage 160. In some embodiments, adjustment function 120 retrieves rules associated with a website, such as website 155 from rules database 165. In one embodiment, adjustment function 120 resides on server 30. In other embodiments, adjustment function 120 may reside on another server, another computing device, or computing device 40, provided that adjustment function 120 has access to website 155, analytics report storage 160, and rules database 165.

Monitoring function 130 operates to monitor access and usage of REST resources and interfaces within a website, such as website 155, and to convert and store JSON data as a self-documenting schema format (e.g., XSD). In one embodiment, monitoring function 130 stores converted data to converted schema data storage 170. In one embodiment, monitoring function 130 is a function of website mobilization program 110. In some embodiments, monitoring function 130 is a stand-alone program. In one embodiment, monitoring function 130 is stored to server 30. In other embodiments, monitoring function 130 may be stored to another server, computing device 40, or another computing device, provided monitoring function 130 has access to converted schema data storage 170 and REST resources located on website 155.

Documentation results function 140 operates to retrieve and insert converted schema data associated with a particular REST resource or web application into REST resource documentation. In some embodiments, documentation results function 140 also operates to return resulting documentation to a user or other requesting entity. In one embodiment, documentation results function 140 is a function of website mobilization program 110. In some embodiments, documentation results function 140 is a stand-alone program. In one embodiment, documentation results function 140 is stored to server 30. In other embodiments, documentation results function 140 may be stored to another server, computing device 40, or another computing device, provided documentation results function 140 has access to converted schema data storage 170.

REST mobilization function 150 operates to identify patterns within REST resources of a website, such as web site 155. REST mobilization function 150 also operates to generate mobile applications for each REST resource based on a template associated with identified patterns of each REST resource. In one embodiment, REST mobilization function 150 resides on server 30. In other embodiments, REST mobilization function 150 may reside on another server, computing device 40, or another computing device, provided REST mobilization function 150 has access to website 155 and template storage 175.

Computing device 40 may be a desktop computer, laptop computer, netbook computer, tablet computer, personal digital assistant, or smartphone. In general, computing device 40 may be any electronic device or computing device capable of processing program instructions, sending and receiving data, and communicating with server 30 over network 20. Computing device 40 contains web browser 180. Computing device 40 may include components, as depicted and described in further detail with respect to FIG. 7.

Web browser 180 may be a generic web browser used to retrieve, present and traverse information resources from the Internet. In some embodiments, web browser 180 may be a web browser designed for a mobile device. In other embodiments, web browser 180 may be a web browser designed for a traditional computing device, such as a desktop computer, PC, or laptop. In general, web browser 180 may be any application or software that enables a user at computing device 40 to access website 155 over network 20. In the depicted embodiment, web browser 180 resides on computing device 40. In other embodiments, web browser 160, or similar web browsers, may reside on other computing devices capable of accessing web site 155 over network 20.

Figure 2:
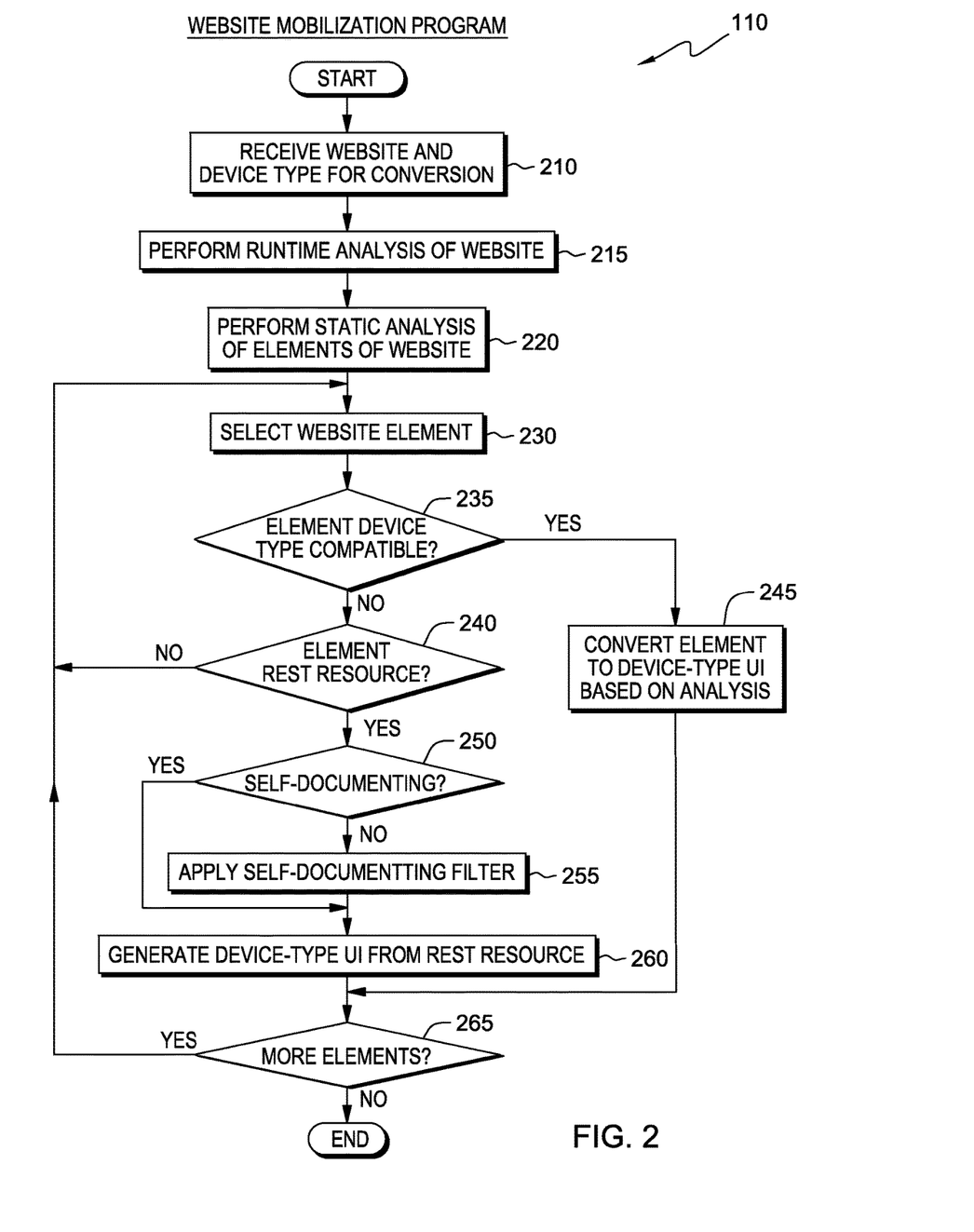
FIG. 2 depicts the flowchart of the steps of a website mobilization program executing within the computing system of FIG. 1, for mobilizing an existing web application, in accordance with one embodiment of the present invention.

FIG. 2 depicts a flowchart of the steps of website mobilization program 110, executing within the computing system of FIG. 1, in accordance with an embodiment of the present invention. Website mobilization program 110 operates to perform runtime and static analyses on a website to determine aspects of the website to mobilize, or otherwise adapt to a different environment. In some embodiments, website program 110 generates a report or other analytics data, and stores such information to a repository, such as analytics report storage 160. Based on the information from the analysis, website mobilization program 110 may adjust UI elements within website 155, at runtime, for a user attempting to access website 155 from a mobile, or other particular type of device. Website mobilization program 110 may also operates to cause REST resources within website 155 to self-document and/or mobilize the REST resources. Website mobilization program 110 may also operate to improve performance of REST resources and REST interfaces using predictive fetching and chunk techniques.

In step 210, website mobilization program 110 receives the website for conversion. In some embodiments, web site mobilization program 110 may further receive a device type upon which the converted website is to be compatible with. In some embodiments, a web developer or other user may input web site 155, or another website or webpage, to website mobilization program 110. In some embodiments, website mobilization program 110 receives a request to access website 155. For illustrative purposes, it will be assumed that website mobilization program 110 has received website 155 for conversion, and the indicated device type is a smartphone. However, embodiments of the present invention recognize that website mobilization program 110 may receive other website and device types in order to process such a conversion.

In step 215, website mobilization program 110 performs a runtime analysis of website 155. In general, website mobilization program 110 collects, analyzes, and/or reports data related to usage of website 155. In some embodiments, website mobilization program 110 performs an external, or off-site analysis of website 155, and collects information related to HyperText Markup Language (HTML) pages loaded, data accessed, widgets used, or other information. Typically, external analysis is used to provide analysis for websites that are designed to request one page at a time from the server. In some embodiments, website mobilization program 110 performs an internal, or on-site analysis of website 155, and collects information, such as: user idle time, mouse clicks on website 155, items or objects used on website 155, cursor location, cursor hovering, or other information. In some embodiments, website mobilization program 110 performs both internal and external analysis functions.

In some embodiments, website mobilization program 110 generates analytics reports or a set of information gathered from a website 155 and stores the information to analytics report storage 160. An analytics report may include information related to a particular version of website 155 and include information related to the usage of website 155 over a specified time period. In some embodiments, website mobilization program 110 collects data from a website 155 by accessing server log files, in which a web server records file requests by browsers (e.g., access logs). In some embodiments, website mobilization program 110 uses a page tagging method, wherein JavaScript embedded in the site page is used to make image requests to a third-party analytics-dedicated server, whenever a page is rendered by a web browser, or whenever a mouse click occurs. Website mobilization program 110 may utilize additional data sources to augment the website and website behavior data described herein. In some embodiments, an analytics report may include information relevant to a web developer regarding the use, or lack of use, of certain pages, portions of the page, or pieces of data used within a website or webpage 110.

In step 220, website mobilization program 110 performs a static analysis of website 155. In general, website mobilization program 110 scans website 155 and identifies elements that may be difficult to convert. For example, scanned elements may include webpages, widgets, or files associated with website 155, such as HTML, JavaScript, Cascading Style Sheets (CSS), images, or other files. In some embodiments, website mobilization program 110 retrieves a set of one or more rules from a repository, such as rules database 165, for use in performing the static analysis. Retrieved rules may indicate elements within website 155 to be flagged, or otherwise annotated as incompatible, in the present form, with the device type indicated for conversion. For example, a rule may specify that a JavaScript widget, or other widget, known to be incompatible with the selected device type should be flagged, or otherwise annotated. In another example, a rule may specify that within an HTML page, a list that is longer than a specified size, a table that exceeds a certain size, or a content area that exceeds a specified size should be flagged, or otherwise annotated. In another example, a rule may specify nested elements or trees in an HTML page that should be flagged or otherwise annotated. In another example, a rule may specify that in HTML or CSS, a sizing or coordinate use is too large and should be flagged or otherwise annotated. In yet another example, a rule may specify that an image file must be above or below a certain resolution, or within a specified size range, and the image falls outside of such parameters, the image file should be flagged or otherwise annotated.

Website mobilization program 110 may perform a scan of website 155, based on retrieved rules, and in some embodiments, may generate a report or a set of information gathered from a website 155, similar to the discussion of step 215, and store the information to analytics report storage 160. Information included in such a report may include, for example, each flagged file associated with website 155 and, based on predefined recommendations, recommendations on how each item may be replaced within a version of website 155 converted for compatibility with the received device type.

In step 230, website mobilization program 110 selects a website element from within website 155. Website elements may include, for example, widgets (e.g., JavaScript widgets), page objects, user interface elements, images, or other elements. In embodiments of the present invention, website mobilization program 110 may iteratively perform each of step 230 through step 265 until each element from website 155 has been processed (see decision 265). In some embodiments, website mobilization program 110 selects each element according to the order listed in the HTML definition, or another definition such as a Web Application Description Language (WADL) definition. In other embodiments, website mobilization program 110 may select each element based on other criteria.

In decision 235, website mobilization program 110 determines whether the selected element is compatible with the device type associated with the conversion. In one embodiment, if no device type was received, the default conversion is for a mobile website. In some embodiments, website mobilization program 110 may determine whether the selected element is compatible with the device type associated with the conversion by retrieving a report generated by the static analysis (see step 220) or other information generated by the static analysis. As previously discussed, embodiments of website mobilization program 110 may flag or otherwise annotate website elements incompatible with the type of device associated with the conversion. In some embodiments, a threshold level may exist for each element of website 155, or portion of website 155 that contains multiple elements, to determine whether each element is compatible with the device type associated with the conversion. For example, a threshold level may be a specific amount or type of incompatibility flagged, or otherwise annotated within an element, or group of elements of web site 155.

Figure 3:
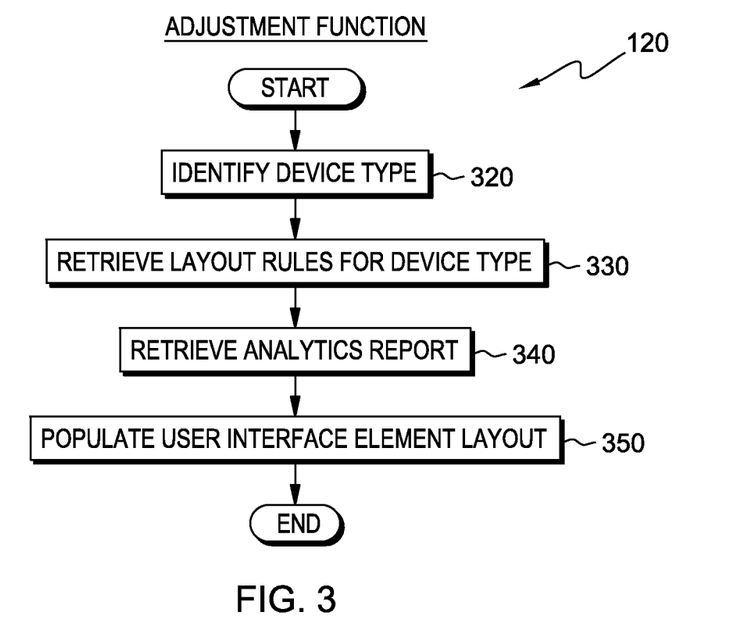
FIG. 3 depicts the flowchart of the steps of an adjustment function executing within the computing system of FIG. 1, for adjusting user interface (UI) elements within a website based on web analytics, accessing device type, and/or other information, in accordance with one embodiment of the present invention.

If website mobilization program 110 determines the selected element is compatible with the device type associated with the conversion (decision 235, yes branch), website mobilization program 110 converts user interface (UI) elements within the selected element or group of elements to UI types that better conform to the device type associated with the conversion (step 245). In some embodiments, website mobilization program 110 converts the element(s) according to information gathered as a result of the runtime analysis (see step 210) and/or the static analysis (see step 220) of website 155. In general, embodiments of website mobilization program 110 populate a UI layout for the device type based upon one or more layout rules associated with the device type. In some embodiments, adjustment function 120, a function of website mobilization program 110, processes the conversion. FIG. 3 depicts a flowchart of the steps of adjustment function 120, in accordance with one embodiment of the present invention.

If website mobilization program 110 determines the selected element is not compatible with the device type associated with the conversion (decision 235, no branch), website mobilization program 110 determines whether the selected element is a REST resource. Website mobilization program 110 may determine that the selected element is a REST resource by an analysis of the interface and type of interactions capable within the selected element. In some embodiments, a method to access the REST resource, such as XMLHttpRequest method may be used. URL parameters to the XMLHttpRequest method may indicate the REST resource. XMLHttpRequest is a method that provides an easy way to retrieve data from a URL without having to do a full page refresh. A webpage can update just a part of the page without disrupting what the user is doing. If website mobilization program 110 determines the selected element is not a REST resource (decision 240, no branch), website mobilization program 110 selects the next element (see step 230). If there are no additional elements for selection, the process is complete.

If website mobilization program 110 determines the selected element is a REST resource (decision 240, yes branch), website mobilization program 110 determines whether the REST resource element is self-documenting (decision 250). Self-documenting is a common descriptor for source code and user interfaces that follow certain loosely defined conventions for naming and structure. These conventions are intended to enable developers, users, and maintainers of a system to use it effectively without requiring previous knowledge of its specification, design, or behavior. In some embodiments, website mobilization program 110 further determines whether the input and/or output of the REST resource element is JSON. Website mobilization program 110 may determine whether REST resource element is self-documenting based on the type schemas and other data associated with, for instance, a JSON interface of the REST resource.

If website mobilization program 110 determines the REST resource element is self-documenting (decision 250, yes branch), website mobilization program 110 proceeds to generate a UI compatible with the device type from the REST resource, as discussed in further detail in reference to step 260.

Figure 4:
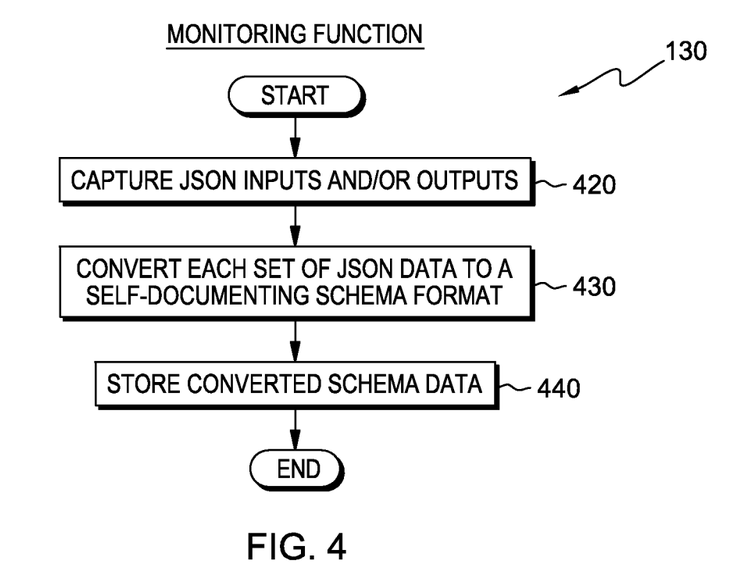
FIG. 4 depicts a flowchart of the steps of a monitoring function executing within the computing system of FIG. 1, for monitoring representational state transfer (REST) resources and converting JavaScript Object Notation (JSON) intput/output data to a self-documenting schema format, in accordance with one embodiment of the present invention.
Figure 5:
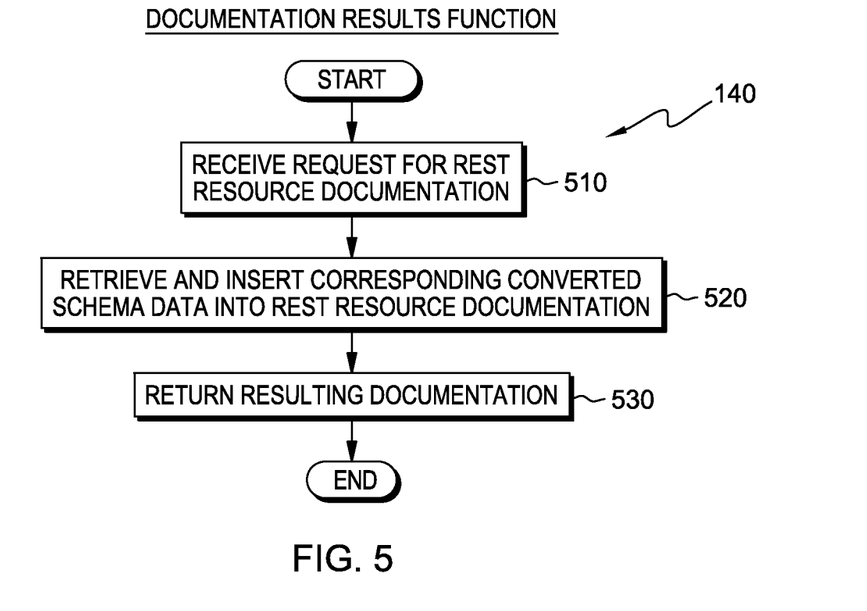
FIG. 5 depicts a flowchart of the steps of a documentation results function executing within the computing system of FIG. 1, for inserting converted schema data into REST resource documentation.

If website mobilization program 110 determines the REST resource element is not self-documenting (decision 250, no branch), website mobilization program 110 applies a self-documenting filter to the REST resource element (step 255). In general, such a self-documenting filter operates to monitor JSON input and/or output data, convert such data to a self-documenting schema format, and insert the information into the REST resource documentation. In some embodiments, monitoring function 130 and/or documentation results function 140, functions of website mobilization program 110, provide such a self-documenting filter. FIG. 4 depicts a flowchart of the steps of monitoring function 130, in accordance with one embodiment of the present invention. FIG. 5 depicts a flowchart of the steps of documentation results function 140, in accordance with one embodiment of the present invention.

Figure 6:
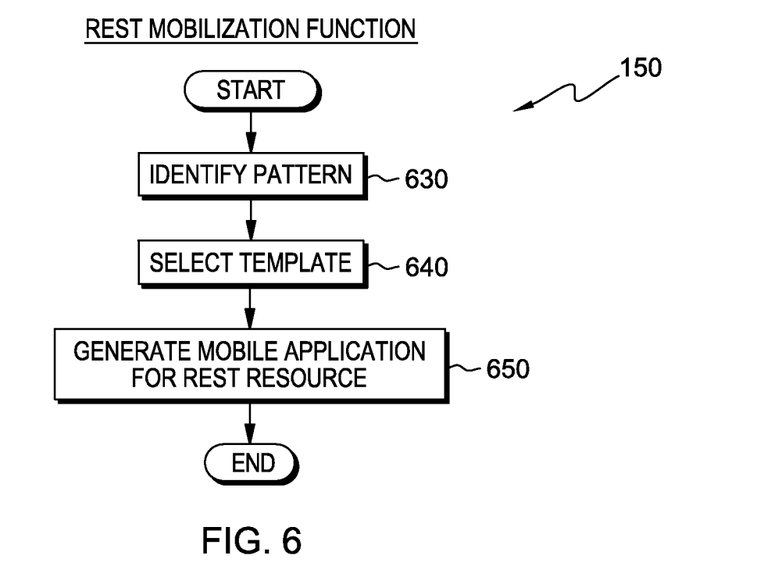
FIG. 6 depicts a flowchart of the steps of a REST mobilization program executing within the computing system of FIG. 1, for identifying patterns within REST resources, and generating mobile web applications based on predefined templates, in accordance with one embodiment of the present invention.

In step 260, website mobilization program 110 generates a UI of the portion of website 155 for the device type indicated for conversion based on data obtained from the REST resource. In some embodiments, if no device type is indicated, website mobilization program 110 generates a UI of the portion for website 155 for a mobile device. In general, website mobilization program 110 identifies one or more patterns within the REST resource, or data of the REST resource corresponding to template, such as a template stored to template storage 175. In some embodiments, REST mobilization function 150 generates a UI of the portion of website 155 for the device type indicated for conversion based on the data obtained from the REST resource. FIG. 6 depicts a flowchart of the steps of REST mobilization function 150, in accordance with one embodiment of the present invention. In some embodiments, when the device indicated for conversion supports applications, website mobilization program 110 generates a native application. A native application is an application, typically for mobile devices, installed directly to the device. Native applications are typically acquired through an online application store or marketplace. In other embodiments, typically for mobile devices, website mobilization program 110 generates a mobile web application. A mobile web application is an Internet enabled application that has specific functionality for mobile devices. Mobile web applications are typically accessed through a web browser of the mobile device, such as web browser 180 of computing device 40.

In some embodiments, website mobilization program 110 may optimize client-side REST resource interfacing to improve performance by using predictive prefetch and chunk techniques. Prefetching occurs when an instruction is requested before it is actually needed. In embodiments of the present invention, website mobilization program 110 may optimize the converted web application based on analytics information, such as the analytics information stored to analytics report storage 160. Based on monitored runtime patterns, website mobilization program 110 may identify data to prefetch based on historical uses of website 155. Embodiments of website mobilization program 110 may detect the type of device accessing website 155 and apply a separate analysis, based on the type of device. In one embodiment, rules are stored to rules database 165 indicating when data should be prefetched, types of data to include in a chunk, or other information. In some embodiments, website mobilization program 110 may generate a native application optimized to improve performance by using predictive prefetch and chunk techniques. In such an embodiment, the generated native application may operate such that, at runtime, the amount of data, or frequency of requests to server 30, are optimized for the type of device that installed the native application. For example, a smartphone may have bandwidth limitations or monthly data caps. Website mobilization program 110 may generate a native application that monitors usage data, by a user of the native application, and server 30 calls to limit the amount of data used by, for example, computing device 40. In some embodiments, website mobilization program 110 may include a variety of rules or constraints within the generated native application to dictate the operations of the native application and communication with server 30.

In one example, website mobilization program 110 may identify a user at computing device 40 selecting items from a list, one by one. A rule may specify, for example, that the entire contents of the list should be sent to an accessing computing device after a predefined number of selections from the list have been selected. In such a situation, website mobilization program 110 may send additional data to computing device 40 based upon the rule. In some embodiments, trends or other patterns may be identified within analytics information stored to analytics report storage 160.

In decision 265, website mobilization program 110 determines whether additional elements from website 155 exist to be processed. In some embodiments, website mobilization program 110 selects each element according to the order listed in the HTML definition, or another definition such as a WADL definition. In other embodiments, website mobilization program 110 may select each element based on other criteria. If website mobilization program 110 determines there are existing elements left to be processed (decision 265, yes branch), website mobilization selects another website element (see step 230) and proceeds similarly to the preceding discussion. If website mobilization program 110 determines there are no existing elements left to be processed (decision 265, no branch), the depicted embodiment of website mobilization program 110 is complete.

FIG. 3 depicts a flowchart of the steps of adjustment function 120, executing within the computing system of FIG. 1, in accordance with an embodiment of the present invention. Adjustment function 120 operates to adjust the presentation, display, and/or layout of UI elements within website 155, based on usage information and analytics information gathered by website mobilization program 110, in accordance with one embodiment of the present invention. Using a series of predefined rules, adjustment program 120 can generate different forms of website 155, or portions of website 155, based on factors such as time of access, accessing device, as well as web analytics information (e.g., popular links, time spent on page, user idle time, etc.), in accordance with one embodiment of the present invention. In some embodiments, website mobilization program 110 causes adjustment function 120 to adjust UI elements with an element, or portion of website 155. In other embodiments, steps associated with adjustment function 120 are performed by website mobilization program 110.

As discussed previously, embodiments of website mobilization program 110 may include internal (e.g., on-site), and/or external (e.g., off-site) analytics techniques for gathering usage information. Embodiments of website mobilization program may monitor externally accessible information, such as HTML pages loaded, data accessed, widgets (e.g., JavaScript widgets) used, types of devices used to access website 155, or the presence of UI artifacts, such as images or other information within cascading style sheets (CSS). Embodiments of website mobilization program 110 may also monitor internal information, such as cursor location, mouse clicks, idle time, or other information. Cursor location, such as a cursor hovering over a field for an extended period of time, may indicate confusion by the user controlling the cursor. Similarly, idle time of a user may indicate that the user is experiencing confusion with website 155. Mouse clicks within website 155 may be used to track the items used on website 155, as well as previous and/or subsequent pages that were loaded (e.g., by following a trail of selected hyperlinks). In some embodiments, website mobilization program 110 may generate one or more reports that include a collection of web analytics and usage information. In other embodiments, website mobilization program 110 may store information gathered. In some embodiments, generated reports or information are stored to analytics report storage 160, for access by website mobilization program 110 and adjustment function 120. In some embodiments, website mobilization program 110 may associate patterns of use based on the type of device, time of day, day of week, or other potential group that affects how users tend to use a website, such as website 155.

A web developer or other user may generate one or more rules for website 155 affecting the layout, presentation, and/or display of website 155. In some embodiments, multiple sets of rules may exist. For example, one set of rules may be directed towards a tablet device attempting to access website 155, while another set of rules may be directed towards a desktop environment attempting to access website 155. In another example, one set of rules may be directed towards a device with touchscreen capabilities, while another set of rules is directed towards devices that lack touchscreen input. Possible rules may include, but are not limited to the following: size of page elements, exclusion/inclusion of widgets or page objects based on frequency of use, level of detail within a list, number of items within a list to be displayed, type of UI element, webpage hierarchy organization within a website, or other potential rules related to layout, presentation, and/or display of UI elements within a website, such as website 155.

In some embodiments, adjustment function 120 adjusts the layout of website 155 and populates a version of website 155 at runtime when, for example, computing device 40 requests to access website 155. In other embodiments, adjustment function 120 periodically creates versions of website 155 based upon updated analytics information or reports generated by website mobilization program 110. In such an embodiment, adjustment function 120 may proceed directly to step 320.

In step 320, adjustment function 120 identifies the device, or type of device attempting to access website 155. In some embodiments, the device type is specified in step 210 (see FIG. 2). In some embodiments, the request from computing device 40 indicates the device or type of device. In some embodiments, the type of device indicated may be, for example, a desktop device or a mobile device.

In step 330, adjustment function 120 retrieves layout rules, or other applicable rules, for the identified device type. Rules, such as layout rules, may be stored to a repository, such as rules database 165. As previously described, a variety of rules may be created by a web developer of website 155 indicating rules relevant to the creation of additional versions of website 155 based on factors such as usage, time, device type, device input capabilities, page object properties, user interface element properties, or other information. For example, a rule for the creation of a version of website 155 may indicate that if a list has less than a specified number of items on a page, the list should display with details, but if the list has more than the specified number of items on a page, the list should be displayed with only names of each item, and a user may be able to select the item to view details of such an item. In another example, a rule may state that items in a list of selectable items (e.g., hyperlinks, selectable elements which display additional information, etc.) should be organized according to popularity, based on hit frequency over a period of time, and that if the list is large, infrequently selected items should be placed at another location, such as within a "more items" menu or selectable UI element.

In step 340, adjustment function 120 retrieves applicable analytics information, usage information, or one or more reports, as generated by website mobilization program 110. In one embodiment, analytics program retrieves the information or one or more reports from a repository accessible by website mobilization program 110, such as analytics report storage 160. In another embodiment, website mobilization program 110 passes relevant information or reports to adjustment function 120. As previously mentioned, analytics reports or information may include usage information generated by website mobilization program 110. Usage information may include information such as widget use, HTML pages loaded, data accessed, type of devices used, cursor tracking, mouse clicks, or other information relevant to the usage of a website, such as website 155. In some embodiments, analytics reports or information may be linked to particular devices, device types, times of usage (e.g., day of week, date, time of day, etc.), or other information. Such information may indicate particular ways users tend to interact with website 155 based on the time of day, day of the week, device type used to access website 155, or other patterns of usage.

In step 350, adjustment function 120 populates or generates the UI element layout, content, and presentation of website 155, or portions of website 155, based on the rules and analytics report or information. In some embodiments, adjustment function 120 populates the content of website 155 at runtime based on a set of predefined layout rules (e.g., rules for the type of device accessing website 155, organizational rules based on analytics report information, etc.) and analytic report information detailing patterns of usage of website 155. By combining the analytics report information with the predefined rules, a website, such as website 155, may be continuously updated based upon usage patterns, temporal patterns (e.g., time of day, day of week, season), patterns associated with devices, and other information relating to the usage of webpage 110.

In some embodiments, adjustment function 120 populates website 155, or portions of website 155, through a feedback loop process. In one example, a web developer may create a JSON configuration metadata file specifying the entire layout of website 155. JSON is a data-interchange format for storing and exchanging text information, similar to XML. In such an example, the JSON configuration metadata file may specify views, modules, stores, models, default views, default transitions, and dependencies within a website, such as website 155. Similarly a JSON configuration metadata file can be generated and used to determine the content of a version of website 155 by specifying information such as items to be shown in a list, based on the most frequently selected items within a time period, using an analytics report generated by website mobilization program 110.

FIG. 4 depicts a flowchart of the steps of monitoring function 130, a function of website mobilization program 110, executing within the computing system of FIG. 1, in accordance with an embodiment of the present invention. Monitoring function 130 operates to monitor REST resource usage, capture input and output data, and convert such data into a self-documenting interchange format, and store the converted data.

In one embodiment, initially, website mobilization program 110 identifies the selected element as a REST resource without self-documentation. In some embodiments, the REST resource element only supports JSON for the input and output of the service. In embodiments of the present invention, the REST resource element does not define a schema for the input and output of the service. Website 155 includes the at least one REST resource element and is accessible by website mobilization program 110 and monitoring function 130, in an embodiment of the present invention.

In step 420, monitoring function 130 captures JSON input(s) and/or output(s) from the REST resource element. In one embodiment, monitoring function 130 captures JSON input and output using a JAX-RS/servlet filter. A servlet is a class used to extend the capabilities of a server. Servlets can be used to extend the applications hosted by web servers. A servlet receives a request and generates a response based on that request. In one embodiment, a portion of a JAX-RS/servlet filter is used by monitoring function 130 to capture both JSON input data (via, for example, "String jsonin=getInput (req);") and JSON output data (via, for example, "String jsonout=getOutput(resp);") with regard to the REST resource element. In some embodiments, one or more conditions specify when data is to be captured. For example, conditions may specify only to capture data when the input/output type is JSON, input/out exists, no schema file already exists (or a specified time has passed since a schema file was last created), if the Hypertext Transfer Protocol (HTTP) method used is not OPTIONS or GET, or other possible predefined conditions. An HTTP method is indicates the desired action to be performed on the identified resource. A REST resource may use HTTP methods as verbs to perform actions on the REST resource.

In step 430, monitoring function 130 converts each set of JSON data to a self-documenting schema format. In one embodiment, monitoring function 130 converts each set of JSON data to an XML schema, such as Document Type Definition (DTD), Regular Language for XML Next Generation (RELAX NG), XSD, or another self-documenting schema format. In one embodiment, monitoring function 130 converts each set of JSON data to XML, and then converts XML to XSD. In another embodiment, monitoring function 130 converts each set of JSON data to JSON schema, and then converts JSON schema to XSD. In still another embodiment, monitoring function 130 converts each set of JSON data directly to XSD. In some embodiments, monitoring function 130 may implement such a conversion within a JAX-RS/servlet filter to covert both JSON input data (via, for example, "String xsdin=convertToXsd(req, jsonin);") and JSON output data (via, for example, "String xsdout=convertToXsd(req, jsonout);") to XSD.

In step 440, monitoring function 130 stores converted schema data, such that the data is accessible to documentation results function 140. In some embodiments, monitoring function stores converted schema data (e.g., XSD) to a repository, such as converted schema data storage 170. In some embodiments, monitoring function 130 associates stored converted schema data with website 155. In some embodiments, monitoring function 130 associates stored converted schema data directly with the REST resource element. In some embodiments, a naming convention is used for each converted set of data. In one embodiment, the naming convention used indicates, within the name of the file, the resource name, HTTP method used (e.g., GET, PUT, etc.), and an indication of whether the converted data was input or output with regard to the REST resource element. In one example, the JSON output for an HTTP GET method to a "users" resource may be stored as converted to XSD, according to a naming convention as follows: <resource>_<method>_<input/output>.xsd. In such an example, the specified JSON output would be stored with the filename users_GET_output.xsd.

FIG. 5 depicts a flowchart of the steps of documentation results function 140, executing within the computing system of FIG. 1, in accordance with an embodiment of the present invention. Documentation results function 140 operates to retrieve converted schema data, as stored by monitoring function 130, and insert such information into applicable REST resource documentation requested.

In one embodiment, initially, website mobilization program 110 has determined that an element selected from website 155 is a REST resource. Website mobilization program 110, or monitoring function 130, has also monitored the REST resource and stored JSON input/output data, as converted, to converted data schema storage 170.

In step 510, documentation results function 140 receives a request for REST resource documentation for a REST resource of website 155. In some embodiments, documentation results function 140 receives the request from website mobilization program 110. In some embodiments, the request for REST resource documentation may specify a format, such as but not limited to, XML, HTML, Web Services Description Language (WSDL), WADL, or other formats. In some embodiments, upon receiving a request for REST resource documentation, documentation results function 140 generates the REST resource documentation, according to the specified format, for sue by website mobilization program 110. In one specific embodiment, a request for WADL is received with regard to the REST resource. In one embodiment, a request is received via an HTTP OPTIONS method.

In step 520, documentation results function 140 retrieves converted schema data (e.g., XSD) corresponding to REST resource 110, and inserts the data into the REST resource documentation. The resulting REST resource documentation may be more complete and current than otherwise obtainable documentation about REST resource 110. In some embodiments, documentation results function 140 retrieves corresponding converted schema data from a repository, such as converted schema data storage 150. As previously described, embodiments of monitoring function 130 may cause converted schema data storage to be stored with information indicating the associated REST resource, webpage, website, or other web application. In some embodiments, converted schema data retrieved by documentation results function 140 is inserted into REST resource documentation via a post generation processing technique. For example, if documentation results function 140 receives a request for WADL, corresponding converted schema data (e.g., XSD) may be inserted via a post-WADL generation process. In some embodiments, a JAX-RS/servlet filter is used to implement such insertion. In some embodiments, predefined conditions may exist that specify when corresponding converted schema data shall be insert into REST resource documentation. For example, predefined conditions may specify to insert converted schema data when an HTTP OPTIONS method is requested, if there is existing and corresponding converted schema data, or other conditions.

In step 530, documentation results function 140 returns the resulting documentation. The provided REST resource documentation, including the inserted corresponding converted schema data, may be utilized to self-document the JSON input and output data for the REST resource of website 155. In some embodiments, documentation results function 140 stores the resulting REST resource documentation to a repository (not shown). In other embodiments, documentation results function 140 causes the resulting REST resource documentation to be returned to the requesting entity or location, such as website mobilization program 110 or REST mobilization function 150.

FIG. 6 depicts a flowchart of the steps of REST mobilization function 150, executing within the computing system of FIG. 1, in accordance with an embodiment of the present invention. REST mobilization function 150 operates to generate mobile web applications, or web applications corresponding to a specified device, based on patterns identified from one or more REST resources within a website, such as website 155, in accordance with one embodiment of the present invention. In some embodiments, website mobilization program 110 performs the function of REST mobilization function 150. Using a series of predefined templates, such as templates stored to template storage 175, REST mobilization function 150 can populate data from a REST resource to a template based on the identified pattern(s).

In one embodiment, initially, website mobilization program 110 has determined that a selected REST resource is self-documenting, or website mobilization program 110 has a caused a self-documenting filter to be applied to the REST resource. Website mobilization program 110 may then execute REST mobilization function 150. A REST resource is, generally, a resource accessible by a well-defined uniform resource identifier (URI). A URI is a string of characters used to identify a name of a web resource. Such identification enables interaction with representations of the web resource over a network, typically the World Wide Web, using specific protocols. A REST resource may use HTTP methods (e.g., GET, POST, DELETE, etc.) as verbs to perform actions on the REST resource. Multiple REST resource members (e.g., /users/{id}) may make up a REST resource collection (e.g., /users).

Further, a web developer or other user may additionally create and store templates associated with patterns identifiable within a REST resource. For example, one template may be associated with a collection pattern. A collection is a simple model for manipulating a set of resources that includes member items that can be added, removed, updated, and/or deleted. Templates, associated with different patterns, may be stored to a repository, such as template storage 175.

In step 630, REST mobilization function 150 identifies a pattern from the selected REST resource. In some embodiments, patterns and criteria associated with each pattern may be stored to template storage 175 along with templates associated with each pattern. In some embodiments, REST mobilization function 150 may access template storage 175 to retrieve predefined patterns or sets of patterns for comparison to the selected REST resource. In some embodiments, REST mobilization function 150 compares information retrieved from the REST resource to predefined patterns or sets of patterns. In such a comparison, REST mobilization function 150 may utilize factors, such as, but not limited to, resource names, URIs, associated HTTP methods (e.g., GET, DELETE, OPTIONS, POST, PUT, etc.), members of resources (e.g., "/user/{id}" may be a member of resource "/users"), or other information. Patterns may include, for example, a collection, collection instance, or resource. A collection is a simple model for manipulating a set of resources. Collections have member items that a user can add, remove, update and/or delete.

In one example, REST mobilization function 150 may identify a collection pattern with a resource "users" because the main URI or uniform resource locator (URL) associated with the resource "users," or "/users," is followed by more than one members (i.e., multiple instances of "/users/{id}"). Further, REST mobilization function 150 may identify that each member, for example, the multiple instances of "/users/{id}", corresponds to a collection instance pattern. REST mobilization function 150 may also take into consideration HTTP methods available in associating one or more patterns with a REST resource. In some embodiments, REST mobilization function 150 may also take into consideration the types of data associated with the REST resource, and the organizational structure associated with that data, such as lists, tables, amount of information, etc.

In step 640, REST mobilization function 150 selects at least one template for the REST resource, based on the identified pattern(s). In some embodiments, patterns are associated with templates and stored to a repository, such as template storage 175, for access by REST mobilization function 150. Each template corresponds to a particular pattern, such that data designed for access in a desktop environment may be more easily accessible on a mobile device, such as a tablet or smartphone. Each template may be, for example, a widget or HTML snippet. Templates may cause detailed sets of information to be displayed such that only certain fields are initially displayed, touchscreen-friendly selection/command methods may be deployed, and/or methods of organization may vary based on each identified pattern. In some embodiments, templates are designed to operate using a model-view-controller (MVC) software pattern for implementing the user interface within the mobile device or tablet. MVC separates internal representations of information from the way information is presented to or accepted from a user. The model notifies associated views and controllers where there has been a change in its state. This notification allows views to update their presentation, and controllers to change the set of commands available to a user. In embodiments of the present invention, the model may be a REST resource of website 155. A view generates an output representation to the user, based on information received from the model and/or view. A controller sends commands to the model to update the model's state, for example, due to use of an available HTTP method. A controller may also be capable of sending commands to the view to change the view's presentation of the model.

A template for an instance of a collection or for a single item may yield a form. Form fields may be included within the selected template based on their organizational structure within the instance data, or by other organizational means. In some embodiments, each form field may be extracted from the resultant REST calls, or from any schemas defined for the REST API. A schema is a way to define the structure, content, and to some extent, the semantics of data. In some embodiments, a template may designate form field labels, or another form field indicator, with names extracted from schema fields corresponding to the selected data.

In step 650, REST mobilization function 150 generates a mobile application, or application suited for the device type specified, for the selected REST resource. In some embodiments, REST mobilization function 150 populates the selected template with data extracted from the selected REST resource. Embodiments of REST mobilization function 150 populate the selected template according to methods previously described, utilizing applicable schemas, data, formats, and other information based on the selected template and the information the selected REST resource represents. For example, REST mobilization function 150 may utilize a template consisting of UI components for a scrollable view and list, with buttons to add and remove items from the list. Such a list may be tied to, or otherwise associated with a data model for the REST resource. In some embodiments, a populated template may include a list of services, wherein each service includes a URI of the REST resource, and HTML method (e.g., GET, DELETE, POST, etc.), and the internet media type of the resulting document.

Figure 7:
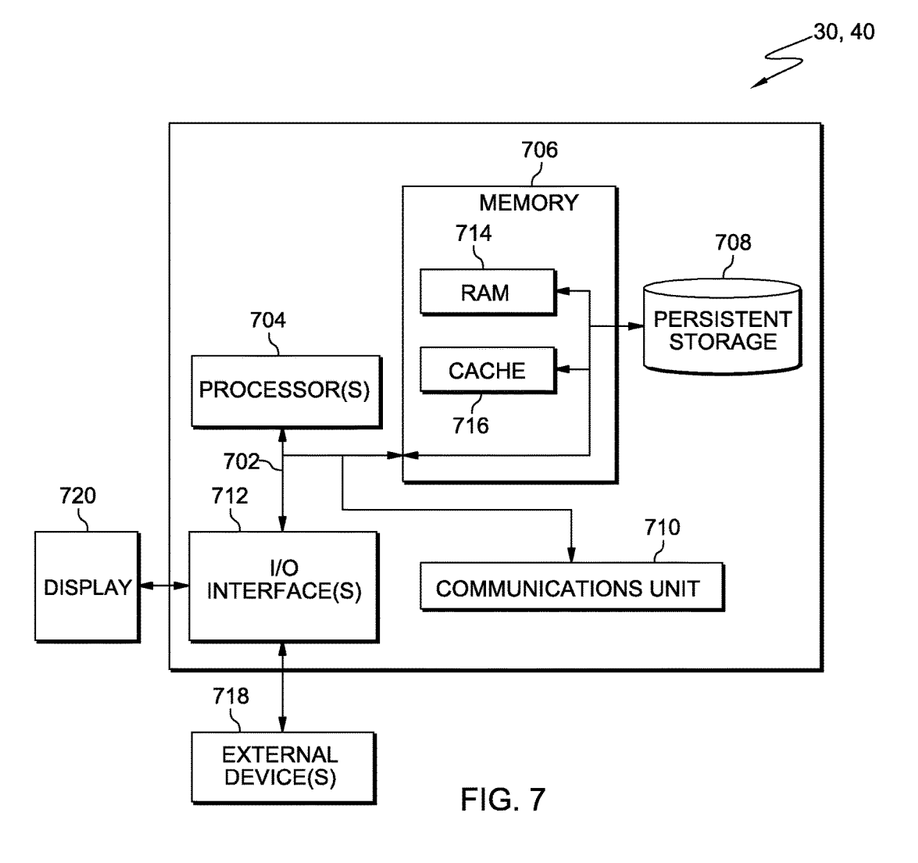
FIG. 7 depicts a block diagram of components of the server and computing device, in accordance with one embodiment of the present invention.

FIG. 7 depicts a block diagram of components of server 30 and computing device 40 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Server 30 and computing device 40 each include communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Website mobilization program 110, adjustment function 120, monitoring function 130, documentation results function 140, REST mobilization function 150, website 155, analytics report storage 160, rules database 165, converted schema data storage 170, and template storage 175 are stored in persistent storage 708 of server 30 for execution and/or access by one or more of the respective computer processors 704 of server 30 via one or more memories of memory 706 of server 30. Web browser 180 is stored in persistent storage 708 of computing device 40 for execution by one or more of the respective computer processors 704 of computing device 40 via one or more memories of memory 706 of computing device 40. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Website mobilization program 110, adjustment function 120, monitoring function 130, documentation results function 140, REST mobilization function 150, website 155, analytics report storage 160, rules database 165, converted schema data storage 170, and template storage 175 may be downloaded to persistent storage 708 of server 30 through communications unit 710 of server 30. Web browser 180 may be downloaded to persistent storage 708 of computing device 40 through communications unit 710 of computing device 40.

I/O interface(s) 712 allows for input and output of data with other devices that may be connected to server 30. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., website mobilization program 110, adjustment function 120, monitoring function 130, documentation results function 140, REST mobilization function 150, website 155, analytics report storage 160, rules database 165, converted schema data storage 170, and template storage 175, can be stored on such portable computer readable storage media and can be loaded onto persistent storage 708 of server 30 via I/O interface(s) 712 of server 30. I/O interface(s) 712 also connect to a display 720. Software and data used to practice embodiments of the present invention, e.g., web browser 180, can be stored on such portable computer readable storage media and can be loaded onto persistent storage 708 of computing device 40 via I/O interface(s) 712 of computing device 40.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for adjusting a web application to comply with user interface capabilities of a device type, the method comprising:

monitoring, by one or more processors, usage patterns of a web application by a user utilizing internal and external analytics techniques, wherein:
  the usage patterns comprise device type and an alternate first usage pattern, and
  the monitoring further comprises externally monitoring, using a Java application programming interface for RESTful Web Services (JAX-RS)/servlet filter, usage of a representational state transfer (REST) resource of the web application, including input network communication data and output network communication data of the REST resource of the web application;
converting, by one or more processors, a set of data from the monitored input network communication data and the monitored output network communication data of the REST resource to Extensible Markup Language Schema (XSD);
updating, by one or more processors, documentation of the REST resource of the web application with the converted set of data;
receiving, by one or more processors, user interface capabilities of the device type;
retrieving, by one or more processors, a set of one or more rules associated with the device type including a first rule to adjust the at least one user interface element based on a corresponding first usage pattern identified during a specified time of access of the web application, wherein the specified time is a time of day;
analyzing, by one or more processors, the web application for compatibility with the user interface capabilities of the device type based on, at least, the set of one or more rules;
analyzing, by one or more processors, the web application for the corresponding first usage pattern during the specified time of access of the web application corresponding to the first rule;
determining, by one or more processors, at least one user interface element to be modified within presentation of the web application on the device type based on the analyzed compatibility of the web application with the user interface capabilities of the device type and the analyzed corresponding first usage pattern during the specified time of access of the web application corresponding to the first rule, wherein:
  the at least one user interface element to be modified comprises a list including a plurality of items, and
  the at least one user interface element to be modified within presentation of the web application on the device type comprises organizing the plurality of items of the list based on hit frequency of each of the plurality of items over a period of time, and adjusting a number of items to display within the list; and
generating, by one or more processors, a version of the web application compatible with the user interface capabilities of the device type that includes the modified at least one user interface element.

2. The method of claim 1, further comprising:
identifying, by one or more processors, a pattern in the REST resource of the web application, wherein the identified pattern in the REST resource corresponds to a first pattern, wherein the first pattern is a collection pattern that corresponds to a predetermined pattern that is associated with a template;
retrieving, by one or more processors, the template corresponding to the identified pattern in the REST resource; and
populating, by one or more processors, the template with data from the REST resource.

3. The method of claim 1, wherein analyzing a web application for compatibility with the user interface capabilities of the device type comprises:
identifying, by one or more processors, at least one aspect of the web application that is incompatible with the device type.

4. The method of claim 2, wherein generating a version of the web application compatible with the user interface capabilities of the device type comprises:
generating, by one or more processors, a native application, wherein the native application utilizes prefetching to retrieve data from the web application based on usage data associated with a user of the native application.

5. The method of claim 1, wherein generating a version of the web application compatible with the user interface capabilities of the device type comprises:
generating, by one or more processors, a version of the web application compatible with the user interface capabilities of the device type comprising the at least one user interface element, as modified, within presentation of the web application on the device type.

6. The method of claim 1, wherein the internal analytics techniques comprise user idle time, cursor location, and mouse clicks.

7. The method of claim 1, wherein the external analytics techniques comprise HyperText Markup Language (HTML) pages loaded, data accessed, widgets used, types of devices used, and presence of user interface artifacts within the web application.

8. The method of claim 1, wherein:
the monitored input data is JavaScript Object Notation (JSON); and
the monitored output data is JSON.

9. The method of claim 1, wherein the at least one user interface element to be modified within the presentation of the web application on the device type comprises a modification to a size of the at least one user interface element to be modified.

10. The method of claim 1, wherein the alternate first usage pattern comprises a runtime pattern.

11. The method of claim 1, wherein the at least one user interface element to be modified within presentation of the web application on the device type further comprises: adjusting a level of detail to display with each item of the plurality of items and placing at least one item of the plurality of items at another location within the web application, wherein the another location is external to the list.

* * * * *